US008831784B2

(12) United States Patent
Wang et al.

(10) Patent No.: US 8,831,784 B2
(45) Date of Patent: Sep. 9, 2014

(54) AUTOMATED BUILDING MONITORING SYSTEM

(75) Inventors: I-Yu Wang, Taipei (TW); Ming-Hsien Pan, Taipei (TW); Chin-Hsuan Chang, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 453 days.

(21) Appl. No.: 13/332,808

(22) Filed: Dec. 21, 2011

(65) Prior Publication Data

US 2013/0066470 A1   Mar. 14, 2013

(30) Foreign Application Priority Data

Sep. 8, 2011   (TW) .............................. 100132360 A

(51) Int. Cl.
*G05B 15/02*   (2006.01)
(52) U.S. Cl.
USPC ............................................. 700/275; 700/9
(58) Field of Classification Search
None
See application file for complete search history.

(56) References Cited

U.S. PATENT DOCUMENTS

| 2003/0084047 | A1* | 5/2003 | Williamson | 707/10 |
| 2008/0069121 | A1* | 3/2008 | Adamson et al. | 370/401 |
| 2012/0245740 | A1* | 9/2012 | Raestik et al. | 700/276 |

* cited by examiner

*Primary Examiner* — Sean Shechtman
*Assistant Examiner* — Steven Garland
(74) *Attorney, Agent, or Firm* — Edwards Wildman Palmer LLP; Peter F. Corless; Steven M. Jensen

(57) ABSTRACT

An automated building monitoring system for monitoring a plurality of apparatuses in a building, includes: a plurality of controllers for controlling the plurality of apparatuses; a controlling platform for providing control-setting information; and a controlling server connected to the controllers and the controlling platform for receiving and storing the control-setting information provided by the controlling platform, and obtaining real-time data of the controllers or real-time data of the apparatuses via the controllers, the controlling server controlling the controllers to control the apparatuses based on the control-setting information and the real-time data of the controllers or the apparatuses. When the controlling platform is abnormal or is abnormally connected to the controlling server, the controlling server continuously monitors the apparatuses in the building based on the stored real-time data of the controllers or the apparatuses.

11 Claims, 2 Drawing Sheets

AUTOMATED BUILDING MONITORING SYSTEM

CROSS-REFERENCES TO RELATED APPLICATIONS

This application claims under 35 U.S.C. §119(a) the benefit of Taiwanese Application No. 100132360, filed Sep. 8, 2011, the entire contents of which is incorporated herein by reference.

BACKGROUND OF THE INVENTION

1. Field of the Invention

The present invention relates to monitoring systems, and, more particularly, to an automated building monitoring system for monitoring various apparatuses in a building.

2. Description of Related Art

In recent years, environmental and sustainability concepts promoted by countries drives the advent of "green buildings," which in terms of planning, construction, use, maintenance to waste removal, are in line with energy saving, resource saving, low pollution and low-waste regulations, providing ecological, energy conserving, waste reducing, and comfortable buildings, such buildings can reduce the impact of building construction on the environment, but also offer people a healthy and comfortable living environment.

On the other hand, information and communication technology (ICT) is also one of the fields that are currently being focused, such as 4G wireless communications, networking, cloud computing, etc. If the ICT industry and green buildings are combined, that is, existing green buildings equipped with high-tech apparatuses that provides smart energy- and water-saving systems, fire systems, security systems, can be commercialized, and provide the public with simple, user-friendly and comfortable living space.

Modern smart green buildings are the products of green buildings with information and communications technologies, such as access control management systems, environmental auto-sensing system, automatic lighting control system, smart electricity meters, smart water meters and so on. However, the management or sensing systems of these buildings are independent of each other, and cannot achieve good communication over a network connection or improved management, such as establishing a database and/or enabling data transmission, leading to buildings operate in long-term power wasting states or loose system management.

Moreover, the management or sensing systems of these buildings mostly include a platform for remotely control by a user through a network. However, if the network connection is interrupted, and the platform and the building end lost communication as a result of this, then the systems at the building end are completely non-functional.

SUMMARY OF THE INVENTION

In the light of forgoing drawbacks, an objective of the present invention is to provide an automated building monitoring system for integrally monitoring apparatuses in the building and continue to carry out efficiently management when the network connection is interrupted.

The automated building monitoring system of the present invention is used for monitoring a plurality of apparatuses in a building, including: a plurality of controllers for controlling the plurality of apparatuses; a controlling platform for providing control-setting information; and a controlling server connected to the plurality of controllers and the controlling platform for receiving and storing the control-setting information provided by the controlling platform, and obtaining real-time data of the plurality of controllers or real-time data of the plurality of apparatuses via the plurality of controllers, the controlling server controlling the plurality of controllers to control the plurality of apparatuses based on the control-setting information and the real-time data of the plurality of controllers or the plurality of apparatuses, wherein when the controlling platform is abnormal or is abnormally connected to the controlling server, the controlling server continuously monitors the plurality of apparatuses in the building based on the stored real-time data of the plurality of controllers or the plurality of apparatuses.

In addition, each of the plurality of controllers has controlling and memorizing functions, such that the plurality of controllers independently control operations of the plurality of apparatuses when the controlling server is abnormal or is abnormally connected to the controlling server.

The controlling server includes: a first communication interface for the controlling server to communicate with the plurality of controllers, so as to obtain the real-time data of the plurality of controllers or the real-time data of the plurality of apparatuses via the plurality of controllers; a second communication interface for the controlling server to communicate with the controlling platform, so as to receive the control-setting information; a real-time information storage for storing the real-time data of the plurality of controllers or the plurality of apparatuses; an information storage for storing the information of the plurality of apparatuses, the information of the controllers, or the information of the controlling server; and a setting-file storage for storing a condition-control setting file converted from the condition-control setting information by the controlling server.

The controlling server may integrally manage and control the apparatuses through the first communication interface and the second communication interface, such that the apparatuses can communicate with each other via the controlling server. In addition, the controlling server receives and stores the information of the controlling server, the controllers and the apparatuses provided by the controlling platform, or logic setting information, so operations of the apparatuses can be coordinated even when the connection between the controlling server and the controlling platform is abnormal.

In addition, the controlling server further includes a controlling module for comparing the real-time information of the plurality of controllers or the plurality of apparatuses and the condition-control setting file, and when the real-time information of the plurality of controllers or the plurality of apparatuses matches a setting condition in the condition-control setting file, a corresponding control process is actuated.

Moreover, the controlling server further includes a warning-event storage. The controlling module compares the real-time information of the plurality of controllers or the plurality of apparatuses and the condition-control setting file, and when a warning event in which the real-time information of the plurality of controllers or the plurality of apparatuses matches the abnormal condition in the condition-control setting file occurs, the warning event is stored in the warning-event storage.

Based on the above techniques, the automated building monitoring system of the present invention can integrally manage and control the once independent apparatuses in the building, such as air conditioning, power, lightings, and access control, etc, so the apparatuses can communicate with each other. Further, under the operations of the controlling server, the operations of the apparatuses can be coordinated even when the network connection with the controlling platform fails.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skill in the art can readily understand the other advantages and functions of the present invention after reading the disclosure of this specification.

Figure 1:
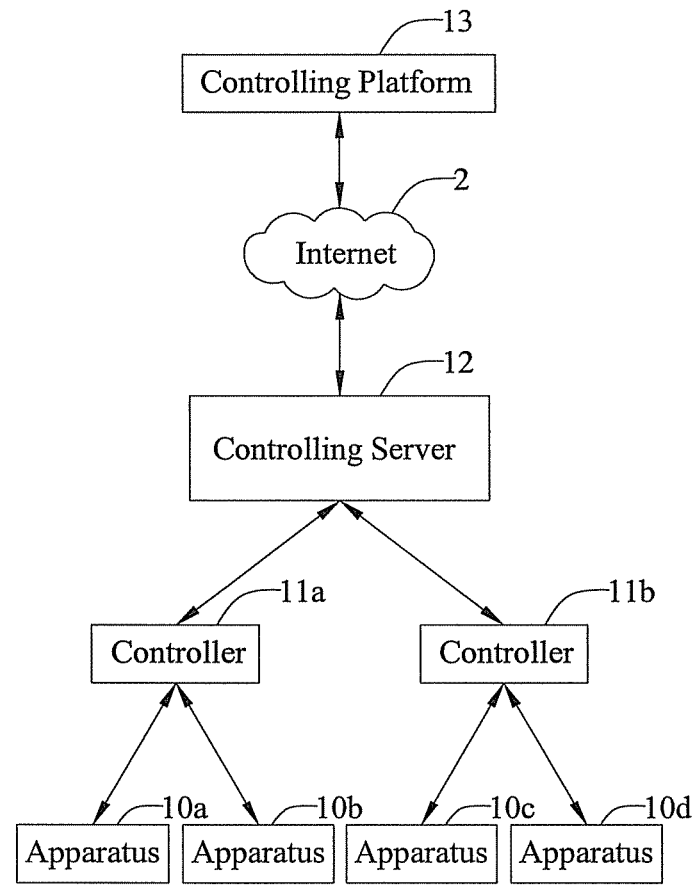
FIG. 1 is a functional block diagram of an automated monitoring system of an embodiment according to the present invention.

Referring to FIG. 1, an automated monitoring system of the present invention includes apparatuses 10a, 10b, 10c and 10d provided in a building, controllers 11a and 11b, a controlling server 12 and a controlling platform 13 connected with the controlling server 12 via a network connection 2.

The apparatuses 10a, 10b, 10c and 10d may include controlled apparatuses and controlled monitoring apparatuses. The controlled apparatuses may be, for example, power, emergency power generation or solar wind power systems, lighting systems, drainage systems, fire monitoring systems, air conditioning and ventilation systems, access control systems, security surveillance systems, and these controlled apparatuses are independent from each other and cannot communicate with each other. In addition, these controlled apparatuses typically include a digital input (DI) or an analog input (AI) for reading the status thereof, and a digital output (DO) or an analog output (AO) for controlling the operation thereof. The controlled monitoring apparatuses may be, for example, multi-function meters, digital meters, flow meters and all kinds of sensors for sensing temperature, carbon dioxide concentration, pressure, movement of personnel, light, etc.

The controller 11a and 11b are used for controlling the apparatuses 10a, 10b, 10c and 10d in a distributed manner and obtaining real-time data of the apparatuses 10a, 10b, 10c and 10d. The controller 11a and 11b may be, for example, a programmable logic controller (PLC), a programmable automatic controller (PAC), a direct digital controller (DDC). The real-time data of the apparatuses 10a, 10b, 10c and 10d may be, for example, the ambient status monitored by the controlled monitoring apparatuses, such as the concentration of carbon monoxide. Controlling in a distributed manner is meant to reduce the loadings of each controller, even if one of them failed, the operations of only a portion of the apparatuses are hindered, thereby distributing risks.

The controlling server 12 is used for obtaining the real-time data of the controllers 11a, 11b or obtaining the real-time data of the apparatuses 10a, 10b, 10c and 10d via the controllers 11a, 11b. In particular, the controlling server 12 is mainly an embedded hardware mainframe provided at the client side (i.e. at the building end), controlled by the controlling platform 13 to access or control the apparatuses 10a, 10b, 10c and 10d in a distributed manner via the controllers 11a, 11b.

The controlling platform 13 is used for providing setting information, including information of the apparatuses 10a, 10b, 10c and 10d, information of the controllers 11a, 11b or information of the controlling server 12, or condition-control setting information. The information of the apparatuses 10a, 10b, 10c and 10d may be, for example, the physical address of the apparatuses 10a, 10b, 10c and 10d or the number of the controller connected thereto. The condition-control setting information may be, for example, information related to scheduling control, process (link) control, and required quantity control etc.

The controlling server 12 therefore stores information of the apparatuses 10a, 10b, 10c and 10d, information of the controllers 11a, 11b or information of the controlling server 12 or condition-control setting information provided by the controlling platform 13, and makes the controllers 11a, 11b to control the apparatuses 10a, 10b, 10c and 10d in a distributed manner based on the real-time data of the controllers 11a, 11b or the apparatuses 10a, 10b, 10c and 10d. When the controlling platform 13 or the connection with the controlling platform 13 is abnormal, the controlling server 12 will continuously monitor the apparatuses 10a, 10b, 10c and 10d in the building based on the stored real-time data of the controllers 11a, 11b or the apparatuses 10a, 10b, 10c and 10d or the condition-control setting information.

Moreover, the controllers 11a, 11b have functions of control and a memory, so as to control the operations of the apparatuses 10a, 10b, 10c and 10d when the controlling server 12 or the connection with the controlling server 12 is abnormal.

It should be noted that the number and connections of controllers 11a, 11b and the apparatuses 10a, 10b, 10c and 10d in the automated building monitoring system of the present invention are not limited to those shown in FIG. 1.

Figure 2:
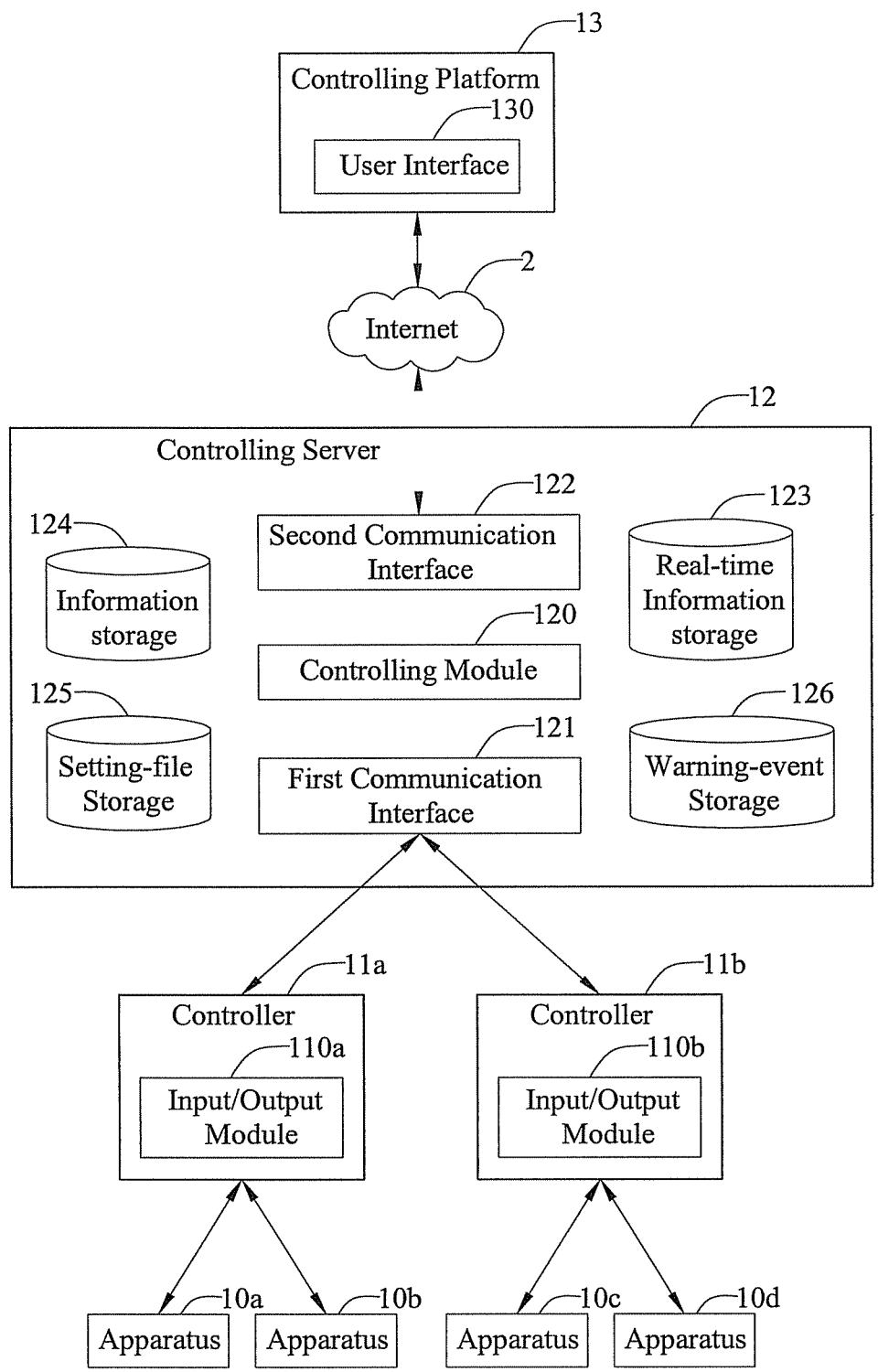
FIG. 2 is a functional block diagram of an automated monitoring system of another embodiment according to the present invention.

Referring to FIG. 2, a functional block diagram illustrating a particular configuration of the automated building monitoring system of the present invention is shown.

The controllers 11a and 11b include input/output modules 110a and 110b, respectively, which are used to connect to the apparatuses 10a, 10b, 10c and 10d in a distributed manner and to obtain the real-time information of the apparatuses 10a, 10b, 10c and 10d. In addition, the controllers 11a and 11b may have both digital and analog controls to perform control on the apparatuses 10a, 10b, 10c and 10d connected in a distributed manner using the input/output modules 110a and 110b. In other words, the controllers 11a and 11b provide stand-alone programmable digital control, and are also equipped with program memory module and battery storage operating program to prevent data or information loss during power shortage.

The controlling server 12 may include a controlling module 120, a first communication interface 121, a second communication interface 122, a real-time information storage 123, an information storage 124, a setting-file storage 125, and a warning-event storage 126.

The first communication interface 121 is used to provide communication between the controlling server 12 and the controllers 11a and 11b, thereby obtaining the real-time data of the controllers 11a and 11b or the real-time data of the apparatuses 10a, 10b, 10c and 10d via the controllers 11a and 11b using the first communication interface 121. In particular, the first communication interface 121 can be in conformance with Modbus or BACNet communication protocol. Moreover, the controlling server 12 stores the obtained real-time data of the controllers 11a and 11b or the apparatuses 10a, 10b, 10c and 10d in the real-time information storage 123.

The second communication interface 122 is used to provide communication between the controlling server 12 and the controlling platform 13, thereby receiving information of the apparatuses 10a, 10b, 10c and 10d, information of the controllers 11a and 11b or information of the controlling server 12 using the second communication interface 123. In particular, the second communication interface 122 can be a HTTP/HTTPS and XML interface. Moreover, the controlling server 12 stores the obtained information of the apparatuses 10a, 10b, 10c and 10d, information of the controllers 11a and 11b or information of the controlling server 12 in the information storage 124. Furthermore, the controlling server 12 stores the condition-control setting information as a condition-control setting file in the setting-file storage 125.

The controlling module 120 compares the real-time information of the controllers 11a and 11b or the apparatuses 10a, 10b, 10c and 10d and the condition-control setting file. When the real-time information of the controllers 11a and 11b or the apparatuses 10a, 10b, 10c and 10d match the setting conditions in the condition-control setting file, a corresponding control process is actuated. On the other hand, when a warning event in which the real-time information of the controllers 11a and 11b or the apparatuses 10a, 10b, 10c and 10d matches the abnormal conditions in the condition-control setting file occurs, the warning event is stored in the warning-event storage 126, and the warning event is then transmitted to the controlling platform 13 via the second communication interface 122.

From the configuration shown in FIG. 2, the controlling server 12 is capable of communicating with the controllers 11a and 11b and controlling the apparatuses 10a, 10b, 10c and 10d via the first communication interface 121. Thus, the controlling server 12 can manage the apparatuses 10a, 10b, 10c and 10d integrally, thereby the apparatuses 10a, 10b, 10c and 10d that are originally independent of each other may communicate with each other through the controlling server 12.

For example, a controller is responsible for a carbon monoxide sensor in a car park. Another controller is responsible for the ventilating fans in the garage. When the controlling server is notified by the controller that the concentration of carbon monoxide sensed by the carbon monoxide sensor exceeds the standard limit, the another controller is instructed to actuate the ventilating fans. On the contrary, when the concentration of carbon monoxide is reduced down to normal, the another controller is instructed to stop the ventilating fans. The standard limit or normal values of the concentration of carbon monoxide are provided to the controlling server by the controlling platform, which may optionally be inputted by a user.

As another example, a first controller is responsible for a digital meter, a second controller is responsible for lighting system, and a third controller is responsible for air conditioning system. When the controlling server detects power consumption during a certain peak period is too large through the digital meter managed by the first controller, it makes the second controller shutting down the lighting systems in certain areas or the third controller shutting down the air conditioning in certain areas to reduce power loadings.

In addition, the controlling server 12 stores the information provided by the controlling platform 13, so that even if the Network connection 2 of the controlling platform 13 is interrupted, the controlling server 12 can still manage the apparatuses 10a, 10b, 10c and 10d efficiently.

In addition, as shown in FIG. 2, the controlling platform 13 may include a user interface 130 for sending or allowing the user to input information of the apparatuses 10a, 10b, 10c and 10d, information of the controllers 11a and 11b or information of the controlling server 12 or condition-control setting information. In addition, after the controlling server 12 returning the real-time information of the apparatuses 10a, 10b, 10c and 10d or the warning event to the controlling platform 13, the user can operate the condition-control setting information appropriately based on this, such as formulating improvement measures.

In summary, the automated building monitoring system of the present invention monitors various apparatuses through controllers in a distributed manner, that is, the controllers will provide the real-time data of the apparatuses to the controlling server, so the apparatuses can communicate with each other via the controlling server. In addition, the controlling server stores information provided by the controlling platform to control or coordinate the apparatuses accordingly, and if the network connection connecting the controlling platform is interrupted, the controlling server can still continuously monitor the stored information. Moreover, the controlling server may also report the real-time data of the apparatuses back to the controlling platform, allowing the user to perform some scheduling or energy management setting on the controlling platform based on the real-time data.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. An automated building monitoring system for monitoring a plurality of apparatuses in a building, comprising:
   a plurality of controllers for controlling the plurality of apparatuses;
   a controlling platform for providing control-setting information; and
   a controlling server connected to the plurality of controllers and the controlling platform for receiving and storing the control-setting information provided by the controlling platform, and obtaining real-time data of the plurality of controllers or real-time data of the plurality of apparatuses via the plurality of controllers, the controlling server controlling the plurality of controllers to control the plurality of apparatuses based on the control-setting information and the real-time data of the plurality of controllers or the plurality of apparatuses,
   responsive to a condition that the controlling platform is abnormal or is abnormally connected to the controlling server, the controlling server continuously monitors the plurality of apparatuses in the building based on stored real-time data of the plurality of controllers or the plurality of apparatuses.

2. The automated building monitoring system of claim 1, wherein the controlling server includes:
   a first communication interface for the controlling server to communicate with the plurality of controllers, the first communication interface obtaining the real-time data of the plurality of controllers or the real-time data of the plurality of apparatuses via the plurality of controllers; and
   a second communication interface for the controlling server to communicate with the controlling platform, the second communication interface receiving the control-setting information.

3. The automated building monitoring system of claim 2, wherein the first communication interface is a Modbus or BACNet communication protocol, and the second communication interface is a HTTP/HTTPS and XML interface.

4. The automated building monitoring system of claim 1, wherein the control-setting information includes information of the plurality of apparatuses, information of the plurality of controllers, information of the controlling server, or condition-control setting information.

5. The automated building monitoring system of claim 4, wherein the condition-control setting information includes scheduling control, process control, or required quantity control, and the information of the plurality of apparatuses includes physical addresses of the controllers to which the apparatuses are connected or the plurality of apparatuses.

6. The automated building monitoring system of claim 4, wherein the controlling server includes:
   a real-time information storage for storing the real-time data of the plurality of controllers or the plurality of apparatuses;
   an information storage for storing the information of the plurality of apparatuses, the information of the controllers, or the information of the controlling server; and
   a setting-file storage for storing a condition-control setting file converted from the condition-control setting information by the controlling server.

7. The automated building monitoring system of claim 6, wherein the controlling server further includes a controlling module for comparing the real-time information of the plurality of controllers or the plurality of apparatuses with the condition-control setting file, and when the real-time information of the plurality of controllers or the plurality of apparatuses matches a setting condition in the condition-control setting file, a corresponding control process is actuated.

8. The automated building monitoring system of claim 6, wherein the controlling server further includes a controlling module and a warning-event storage, the controlling module compares the real-time information of the plurality of controllers or the plurality of apparatuses with the condition-control setting file, and when a warning event in which an real-time information of the plurality of controllers or the plurality of apparatuses matches an abnormal condition in the condition-control setting file occurs, the warning event is stored in the warning-event storage.

9. The automated building monitoring system of claim 1, wherein the controlling platform includes a user interface for condition-control setting information to be input therein via a network.

10. The automated building monitoring system of claim 1, wherein at least one of the controllers includes an input/output module connected with the plurality of apparatuses and obtaining the real-time information of the plurality of apparatuses.

11. The automated building monitoring system of claim 1, wherein each of the plurality of controllers has controlling and memorizing functions, such that the plurality of controllers independently control the plurality of apparatuses when the controlling server is abnormal or the each of the plurality of controllers is abnormally connected to the controlling server.

* * * * *